Sept. 16, 1969  B. LEMONICK  3,466,930
FOOTBALL TRAINING APPARATUS
Filed Feb. 10, 1966  4 Sheets-Sheet 1
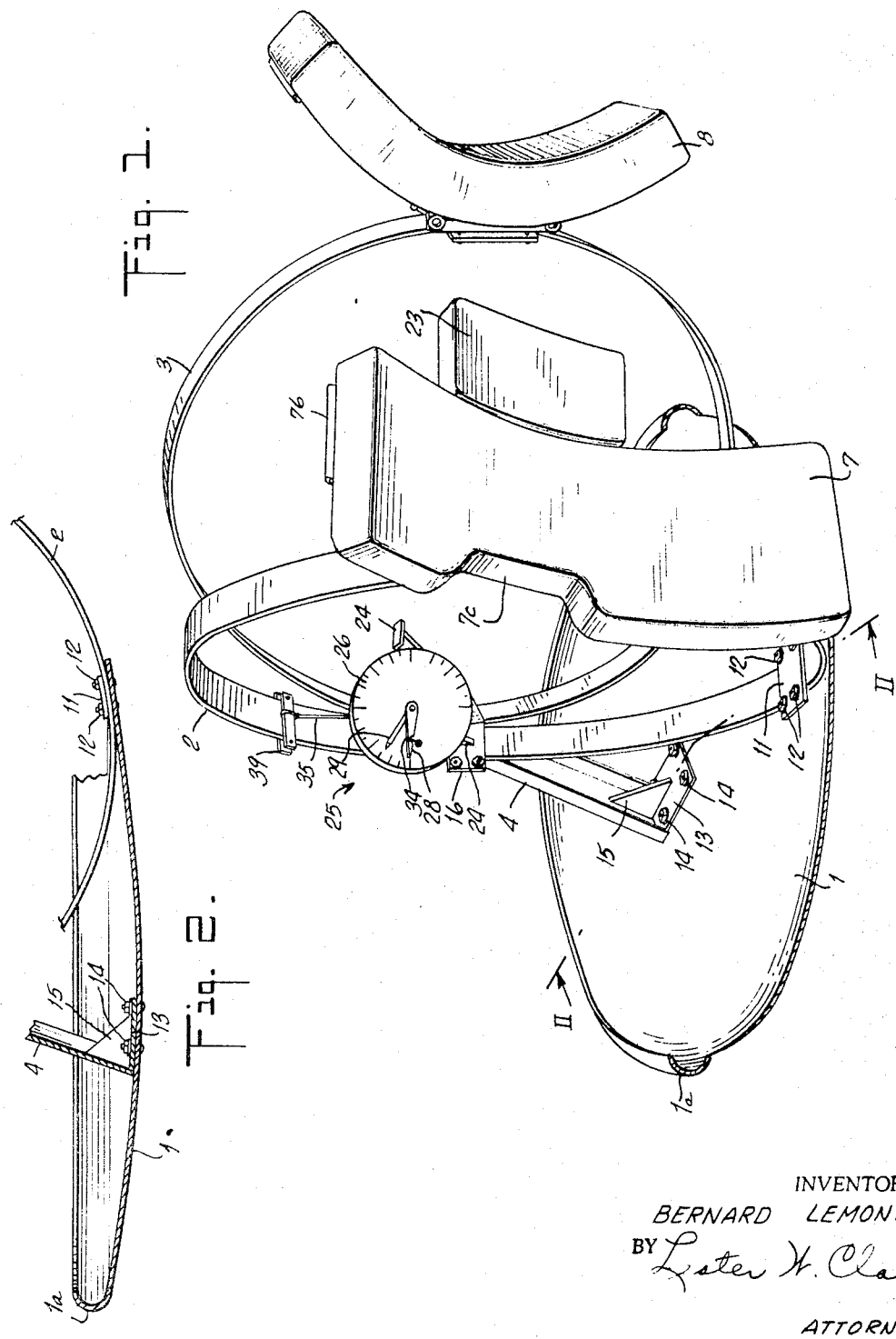
INVENTOR.
BERNARD LEMONICK
BY Lester W. Clark
ATTORNEY Sept. 16, 1969  B. LEMONICK  3,466,930
FOOTBALL TRAINING APPARATUS
Filed Feb. 10, 1966  4 Sheets-Sheet 2
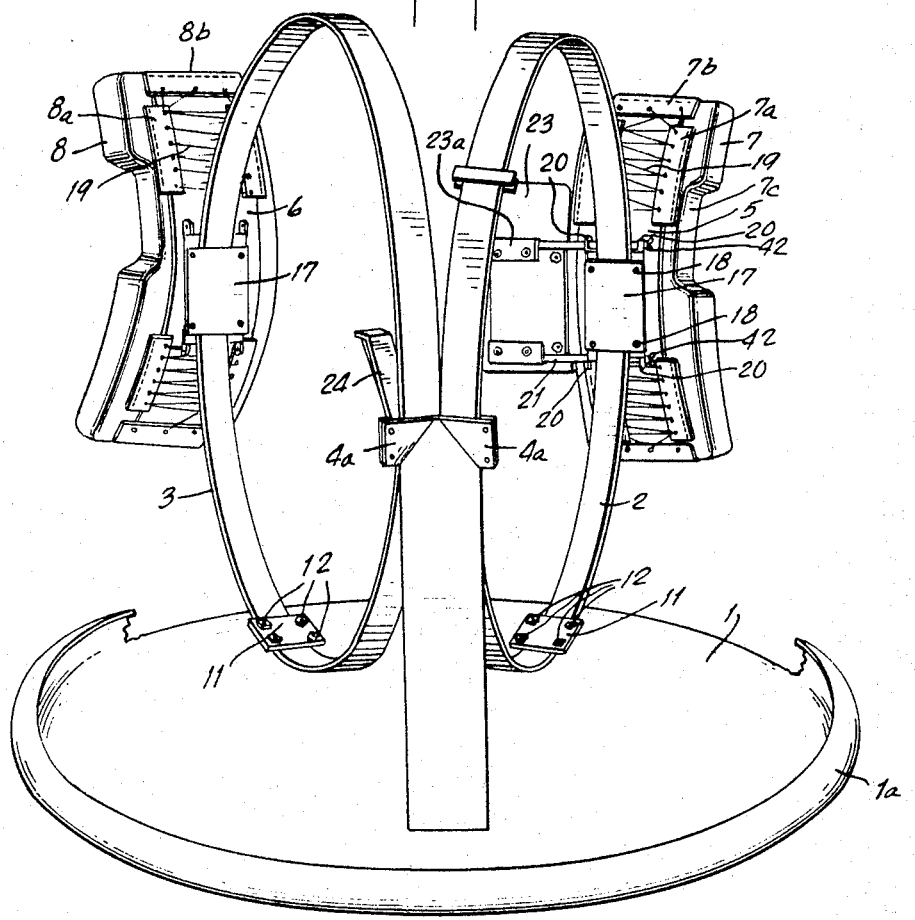
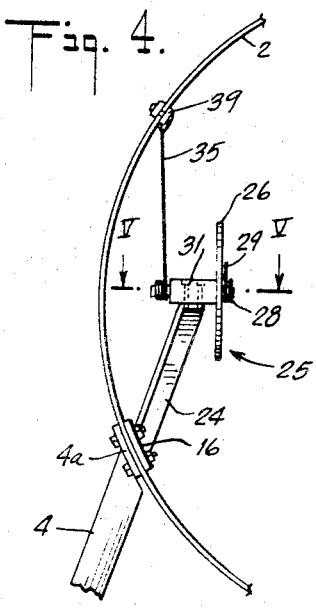
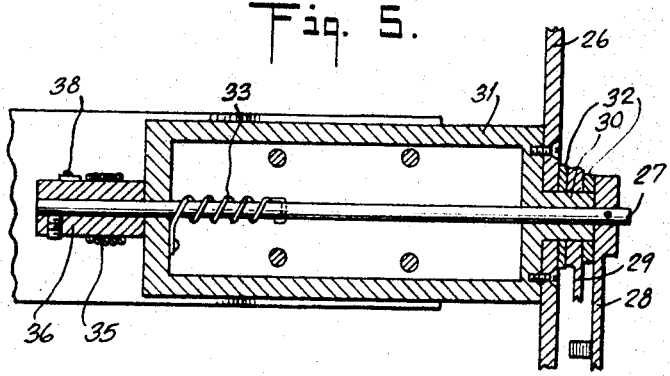
INVENTOR.
BERNARD LEMONICK
BY Lester H. Clark
ATTORNEY

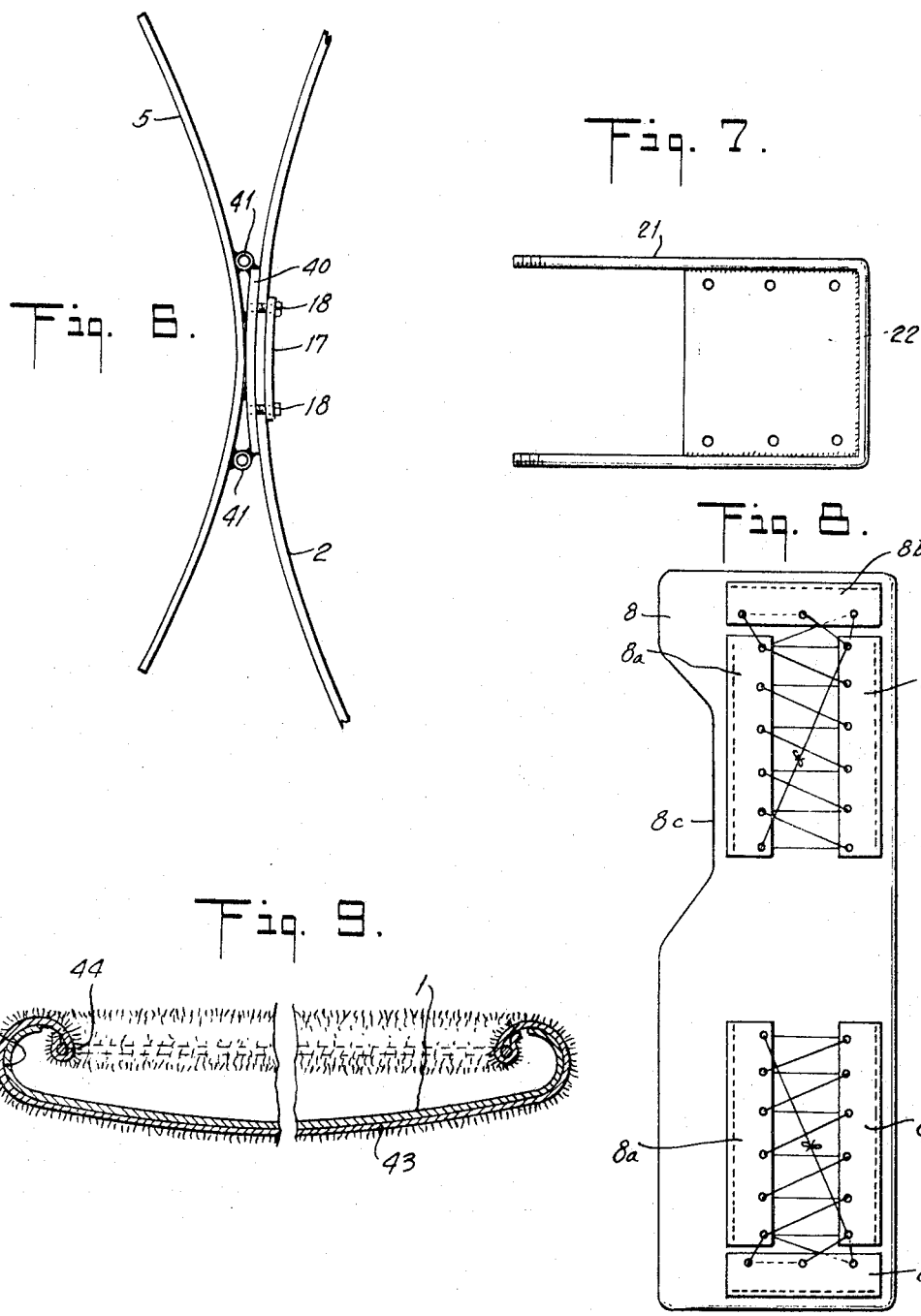

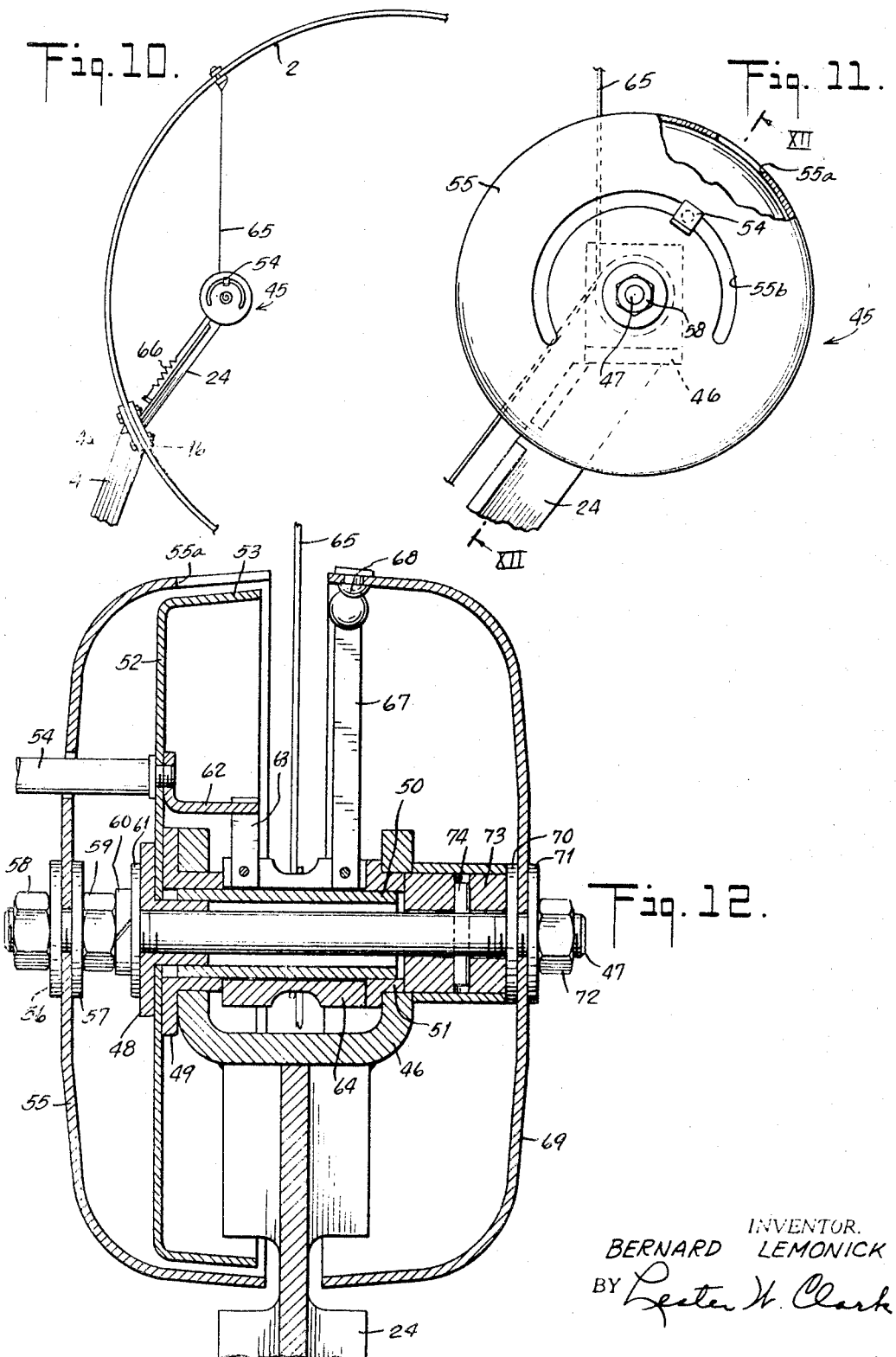

United States Patent Office 3,466,930
Patented Sept. 16, 1969

3,466,930
FOOTBALL TRAINING APPARATUS
Bernard Lemonick, 405 Westview Road,
Elkins Park, Pa. 19117
Filed Feb. 10, 1966, Ser. No. 526,454
Int. Cl. A63b *69/34, 69/00;* A69b *67/00*
U.S. Cl. 73—380                                       15 Claims

ABSTRACT OF THE DISCLOSURE

A simplified and easily dismantled football training apparatus used for training linemen to correctly charge the opposing line. The apparatus includes one or two impact receiving structures, each supported by a vertical resilient hoop attached to a generally horizontal downwardly convex plate, which rests upon the ground or a floor. Attached to each hoop may be an impact measuring device.

---

This invention relates to football training apparatus, and particularly to apparatus for training linemen to charge the opposing line.

This application discloses and claims subject matter which is in part also disclosed in my copending application Ser. No. 16,814, filed Mar. 22, 1960, now issued on Feb. 22, 1966 as Patent No. 3,236,101, entitled "Collapsible Charging Apparatus For Football Practice."

There is disclosed in my aforesaid copending application, an athletic training apparatus including an impact receiving structure adapted to be charged by a trainee, who will typically chrage the apparatus from a crouching (either still or running) position such as is conventionally used by a football player. The apparatus disclosed in my copending application also includes a resilient support for the impact receiving structure, and means for indicating the deflection of the resilient support by the trainee's charge, and hence the amount of force expended on the structure by the trainee.

An object of the present invention is to provide an improved and simplified athletic training apparatus of the type described.

Another object of the invention is to provide an improved athletic training apparatus which may be readily dismantled for storage or shipment in a small space.

Another object is to provide athletic training apparatus of the type described which is so constructed as to guide the head, shoulder and forearm of the trainee into the best positions for effective play and for his own personal safety.

A further object is to provide an improved football training apparatus of the type described including an impact indicator so positioned that the trainee can observe the indicator only by maintaining his head in the proper position for effective play.

A further object is to provide an apparatus of the type described including a forearm engaging element so positioned that the trainee can bring his forearm into engagement with it only by having his forearm in the proper position for effective play.

The foregoing objects are attained in the apparatus described herein. That apparatus includes a base formed of a generally horizontal, downwardly convex plate, and one or two resilient hoops mounted tangentially to the plate and extending upwardly therefrom. Each hoop is attached to the plate at its point of tangency with the plate and has one portion extending from the point of tangency outwardly beyond the edge of the base. The impact receiving means is mounted on that outwardly extending portion. Another portion of the hoop extends inwardly and upwardly from the point of tangency. A rigid brace extends between a point on the base spaced from the point of tangency and a point on the inwardly extending portion of the hoop.

Where two hoops are used, a single brace serves for both hoops. The connections between the base, the hoop, the brace and the impact receiving means are all made by means of bolts and nuts so that the apparatus is readily demountable for shipment or storage.

The impact receiving means includes a principal vertically elongated relatively stiff spring member including a central portion presenting a concave surface to the shoulder of a charging trainee. The impact receiving surface of this vertically elongated member is covered by a pad or cushion of suitable construction. The pad is somewhat wider than the elongated member and its vertical center line is offset laterally from the vertical center line of the elongated spring member so that it extends beyond that member substantially along one side only. The extending side of the pad has a wide, shallow notch above the central portion of the elongated member, the notch serving to allow passage of the head of the charging trainee and to guide the trainee in striking the impact receiving member with his shoulder at the proper point.

Attached to the principal impact receiving member at its central portion is a laterally extending frame acting as an auxiliary impact receiving member and covered by a pad which extends upwardly from the frame. The auxiliary impact receiving member and its pad are intended to receive the impact of the trainee's forearm as he charges the apparatus. The trainee can strike the auxiliary impact receiving member with his forearm only by having his forearm in the proper playing position, i.e., substantially as high as or higher than his shoulder.

Other objects and advantages of the invention will become apparent from a consideration of the following specification and claims, taken together with the accompanying drawings.

In the drawings:

FIG. 1 is a perspective view of one form of training apparatus embodying the invention;

FIG. 2 is a cross-sectional view taken on line II—II of FIG. 1, looking in the direction of the arrows;

FIG. 3 is a rear perspective view of the apparatus of FIG. 1, with certain parts omitted;

FIG. 4 is a sectional view through a portion of the apparatus illustrating one form of indicator means;

FIG. 5 is a cross-sectional view on the line V—V of FIG. 4, taken on an enlarged scale;

FIG. 6 is a fragmentary view illustrating the attachment of the impact receiving member to the hoop;

FIG. 7 is a view illustrating the frame structure which supports the forearm impact receiving means;

FIG. 8 is a rear view of a pad adapted for mounting on the impact receiving means;

FIG. 9 is a cross-sectional view showing the base of the apparatus with a covering thereon which is intended to facilitate use of the apparatus indoors;

FIG. 10 is a view similar to FIG. 4, showing another form of indicator means;

FIG. 11 is an enlarged elevational view of the principal mechanism of the indicator means of FIG. 10, partly broken away; and FIG. 12 is a cross-sectional view taken on the line XII—XII of FIG. 11.

Referring to FIGS. 1 and 3, there is shown an athletic training apparatus including a base 1, two hoops 2 and 3, a brace 4, a pair of impact receiving members 5 and 6, and a pair of pads 7 and 8 covering the impact receiving members 5 and 6.

In describing the apparatus, the side thereof nearest a charging trainee will be described as the front and the side farthest from the trainee will be described as the back.

The base 1 is a concave plate which may be of forged or spun steel or other suitable material. Such a plate is commercially available for use as the end of a cylindrical tank or boiler. The periphery of the plate has an upwardly extending, outwardly convex, flange 1a, preferably formed integrally therewith, and preferably having a radius of curvature of about 4". The flange 1a allows the base to tip upwardly when a trainee hits an impact receiving member too high while maintaining a convex surface in contact with the ground. The relatively narrow convex surface in contact with the ground at such times reduces the friction between the base and the ground and allows the apparatus to slide backwards as a whole away from the trainee.

If the convex flange 1a were not provided, the relatively sharp edge of the base 1 might dig into the ground and provide sufficient resistance at that point so that the force applied by the trainee would turn the apparatus over with a resultant possible injury to the trainee.

While the flange is needed most along the back of the base, it is convenient to have it extend all the way around the base, thereby facilitating movement of the apparatus.

Each of the hoops 2 and 3 is fastened to the base 1 at its point of tangency with the base, preferably by means of a plate 11 attached to the base by bolts 12. The plate 11 straddles the hoop so that the hoop is clamped between the plate 11 and the base 1. The bolts 12 are readily removable by simple loosening and removing their associated nuts, so that the hoop can be disengaged from the base. The point of tangency of each of the hoops 2 and 3 with the base 1 is spaced from the center of the base, and is in fact nearer the periphery of the base than it is to the center, as best seen in FIG. 3.

The brace 4 consists of a beam of channel-shaped cross-section provided at its lower end with a forwardly projecting flange 13, which is attached to the base by means of bolts 14 and cooperating nuts. A reinforcing plate 15 connects the flange 13 with the web of the channel-shaped brace 4. The upper end of the brace 4 is provided with a pair of bent back rings 4a (FIG. 3), against which the hoops 2 and 3 abut tangentially. A plate 16 (FIG. 1) extends across the front of the back portions of the hoops 2 and 3 and is bolted at its ends to the wings 4a. The plate 16 cooperates with the wings 4a and their associated bolts to hold the innermost portions of the hoops 2 and 3 firmly clamped against the top of the rigid brace 4.

An outer portion of each hoop extends upwardly and outwardly from its associated clamp plate 11 and carries near its farthest forward extremity an impact receiving member 5, best seen in FIG. 6, which is preferably a relatively stiff plate which is outwardly concave, at least at its center portion. The upper and lower end portions of the members 5 and 6 may be made relatively straight, as shown, or may be either slightly concave or slightly convex, as preferred, on their outer faces, i.e., the faces which are charged by the trainee. One of the objects of the device is to teach the trainee to hit the central concave portion of the impact receiving member 5 or 6 with his shoulder, so that the trainee learns to remain in the most advantageous striking position relative to an opponent, i.e., below the opponent's shoulder area. Consequently, the upper and lower end portions should be so contoured as to guide the trainee's shoulder toward the central portion if in fact his shoulder should strike the impact receiving member above or below the center.

The impact receiving members 5 and 6 are attached to the hoops 2 and 3, respectively, by means of clamping plates 17 attached to the impact receiving members 5 and 6 by means of bolts 18 and cooperating nuts. By loosening the bolts 18, the entire impact receiving assembly, including the plate member 5 or 6, the clamping plate 17, and the cushion 7 or 8 mounted on the member 5 may be adjusted upwardly and downwardly along the hoop as may be required to make the apparatus suitable for the use of trainees of different sizes. For example, for a young boys' team, the impact receiving members would be substantially lower than for a team of more mature players.

The impact receiving members 5 and 6 are covered on their front faces by pads 7 and 8, which are attached to the impact receiving members 5 and 6 by means of flaps 7a, 7b, 8a, 8b, and laces 19 (FIGS. 3 and 8). The pads 7 and 8 have their vertical center lines out of alignment with the vertical center line of the impact receiving members 5 and 6, so that the pads project beyond the impact receiving members substantially on the outer sides thereof. That is to say, the left-hand pad 7, as viewed in FIG. 1, projects beyond the impact receiving member 5 on the left-hand side thereof (the right-hand side as viewed in FIG. 3). Above the central portion of the pad 7, it is provided along its outer edge (right-hand edge as viewed in FIG. 3) with a broad, shallow notch or recess 7c, which is intended to permit passage of the head of the charging trainee when he strikes his shoulder against the central portion of the pad 7. The notch 7c serves as a target for the trainee and as a guide for his head, and hence guides his shoulder to strike the pad 7 at the proper height. Pad 8 is similarly provided with a notch 8c.

The back surfaces of the impact receiving members 5 and 6 are provided with a set of four projecting lugs 20, which are adapted to receive the legs of a U-shaped frame 21 (see FIGS. 3 and 7). The central portion of the closed end of the U-shaped frame 21 is filled by a plate 22, which is welded to the frame around three of its sides. The frame 21 and plate 22 are adapted for the mounting of a forearm striking pad 23 having its lower edge just below the frame 21 and its upper edge extending somewhat above the frame 21. The purpose of the pad 23 is to teach the trainee to utilize the impact of his forearm as well as his shoulder. The location of the pad 23 and its upward extension teaches the trainee to get his forearm at least as high as his shoulder when impact is made with an opponent. The pad 23 is mounted on the plate 22 by means of flaps 23a on the back of the pad, which flaps are provided with reinforced apertures for receiving bolts extending through the plate 22.

Projecting forwardly and upwardly from the plate 16 are two brackets 24 (FIG. 4—in FIG. 3, one bracket is omitted), which may be of a T-shaped cross-section, as shown. On the upper or forward end of each of these brackets 24 is mounted an indicator (FIG. 1—omitted from FIG. 3) generally shown by the reference numeral 25. The indicator 25 includes a scale 26 and a shaft 27 extending through the center of the scale 26 and carrying a pointer 28. Another pointer 29 is frictionally mounted on the hub 30 (FIG. 5) of a casing 31 which supports the shaft 27. For example, the friction may be obtained by the use of washers 32 of friction material between the pointer 29 and the other adjacent elements on the hub 30. The shaft 27 is biased by means of a coil spring 33, within the casing 31, to an angular position in which the pointer 28 rests against a zero stop 34.

Outside the rear end of the casing 31 the shaft 27 carries a cable 35, which is wound around a drum 36 attached to the shaft 27, and has one end fixed to that drum, as at 38. The other end of the cable 35 extends upwardly and is fixed to a clamp 39 attached to the hoop 2 at a point spaced from the rigidly fixed portion of the hoop which is clamped between the plate 16 and the brace 4.

When the hoop 2 is in its normally undeflected condition, the cable 35 should be tightened so that the pointer 28 just rests against the stop 34. When a trainee charges against the impact receiving member on the hoop 2, the hoop bends from its normal circular contour to a more elliptical contour, increasing the distance between the clamp 39 and the shaft 27, which is fixed by means of its rigid attachment to the brace 4. This increase in the distance spanned by the cable 35 causes the cable to rotate the shaft against the spring 33, thereby turning the pointer 28 over the scale 26 to give an indication of the amount of force applied to the apparatus by the charging trainee.

The slip friction pointer 29 may be adjusted by the coach to indicate to the trainee the movement of the pointer 28 which he should be able to achieve when charging the apparatus. If desired, the pointers 29 and 28 may be provided with electrical contacts connected in a circuit so as to actuate a signal, for example, an audible signal, whenever the trainee brings the pointer 28 up to the position of the pointer 29. Such an audible signal allows the coach to determine the effectiveness of his trainees in several different locations by simply listening for the audible signals from each location.

FIG. 6 illustrates a modified form of connection between the impact receiving member 5 and the hoop 2. There is welded to the back of the central portion of the member 5 a plate 40, which is curved in the opposite direction to the member 5. The plate 40 is connected by means of the bolts 18 to the clamp plate 17, which may be the same plate as viewed in FIG. 3. A pair of hollow tubes 41 are welded between the ends of the plate 40 and the back side of the member 5. These tubes are provided to receive the legs of the U-shaped frame 21 when the forearm impact receiving attachment is used.

The ends of the frame 21 are threaded to receive wing nuts. By removing the wing nuts, the forearm impact receiving means including the frame 21 and pad 23 may be readily detached if its use is not required for a particular training operation.

Preferably, the hoops 2 and 3 are made of a somewhat smaller diameter than the base 1, so that when the apparatus is disassembled for storage or shipment, the two hoops fit within the periphery of the base 1. All the other parts are readily disassembled by the removal of nuts and bolts and can be stored within the hoops, so that the entire apparatus makes a very compact package.

While it is presently preferred to make the base 1, the hoops 2 and 3, the brace 4, and the impact receiving members 5 and 6 of steel, my invention is not limited to the use of any specific material, and other suitable metals or non-metals may be substituted for steel in any of the parts mentioned.

FIG. 9

There is shown in FIG. 9 an attachment which may be used when it is desired to use the apparatus indoors, on a smooth floor. FIG. 9 shows the base 1 covered by a sack generally conforming to the shape of the base 1 and covering the flange 1a. The sack is generally indicated at 43, and has a substantial coefficient of friction on its outer surface. The sack 43 is held in place by any suitable means such as a drawstring 44.

The covering 43 provides substantial friction between the base and the underlying surface, which is effective to prevent undue movement of the training apparatus when used on a smooth floor. Furthermore, the sack 43 is effective to protect the floor from damage due to such movements.

FIGS. 10 to 12

These figures show at 45 a modified form of indicator which may be utilized in place of the indicator 25 illustrated in FIGS. 1, 4 and 5. The indicator 45 is mounted on a bracket 24, which may be the same as bracket 24 of FIG. 4. The bracket 24 shown in FIGS. 11 and 12 is T-shaped in cross-section, and supports at its upper end a short beam 46 of U-shaped cross-section. An arbor 47 extends through the opposite flanges of the U-shaped beam 46. Encircling the arbor 47 where it passes through the left-hand flange of the beam 46, as it appears in FIG. 12, are two concentric flanged sleeves 48 and 49, of slip-friction material. The outer sleeve 49 fits snugly in the aperture in the flange of beam 46. A spacer sleeve 50 is positioned between the concentric portions of the sleeves 48 and 49 and extends between the flanges of the beam 46. Another flanged sleeve 51 is provided between the right-hand end of sleeve 50 and the right-hand flange of beam 46.

An indicator drum 52 has its central portion gripped between the flanges on the sleeves 48 and 49. The outer periphery of the drum 52 carries on its surface a suitable scale 53, which may be arbitrary, for indicating the impact with which the apparatus is charged by a trainee.

At an intermediate point, radially spaced from arbor 47, the drum 52 carries an indicator reset rod 54 which projects parallel to the arbor 47. A bell-shaped cover 55 encloses the left-hand half of the indicator and is provided with an arcuate slot 55b through which the indicator reset rod 54 projects. The cover 55 is apertured to receive the arbor 47 and is clamped on the arbor between two washers 56 and 57 which are held between two nuts 58 and 59. At the opposite side of nut 59 from the cover 55 are two washers 60 and 61, positioned between the nut 59 and the flange of the innermost friction sleeve 48. Adjustment of the nut 59 on the threaded portion of the arbor 47 allows adjustment of the friction force applied to the drum 52.

The drum 52 is rotated against that friction force by a one-way driving connection including an arm 62 extending to the right from the drum 52, with its end lying in the path of a driving arm 63 mounted on a grooved pulley 64, which is freely rotatable on the sleeve 50.

A cable 65, which corresponds generally to the cable 35 of FIG. 4, has one end attached to the hoop 2 and is wrapped approximately one and one-half turns about the grooved pulley 64. The other end of the cable is attached to one end of a coil spring 66, whose opposite end is fixed to the hoop 2 at the mounting for the bracket 24.

The grooved pulley 64 also carries a striker arm 67 which cooperates with a striker plate 68 attached to a bell-shaped cover corresponding generally in shape to the cover 55, but facing in the opposite direction. The cover 69 is held on the arbor 47 between two washers 70 and 71 fixed in place by a nut 72. A spacer block 73 extends between washer 70 and the sleeve 51, and is pinned to the arbor 47 by a pin 74.

The scale 53 on the periphery of drum 52 is visible to a charging trainee only through an aperture 55a in the periphery of the cover 55. This aperture 55a is so located that the trainee can see it only by raising his head at the same time, that his shoulder is lowered to engage the cushion 7. This insures that the trainee's back is arched and that his head, neck, shoulders, back, thighs, and legs are in the proper positions for charging so as to produce the maximum impact against the charging machine with complete safety to himself.

The portion of the scale 53 visible to the charging trainee through the aperture 55a indicates the maximum deflection of the hoop by the trainee, and therefore indicates the total impact of the trainee against the apparatus. Note that the drum 52 and scale 53 are positively driven only in the direction indicative of increasing force applied to the impact receiving member. In other words, the drum 52 is driven when the pulley 64 is rotated by the cable 65. After the drum 52 reaches its position of maximum rotation, the one-way driving connection separates between the arms 63 and 62, and arm 63 returns to its original position, leaving drum 52 in a position indicative of the total impact. The drum 52 may be reset by grasping the reset rod 54. Resetting will commonly be done by a coach. Hence, a single coach may watch several of these machines and supervise the training of several players at one time.

The bell may be preset by rotating the cover 69 to change the position of the striker plate 68, so that the bell-shaped cover 69 rings when the impact delivered by the player exceeds a predetermined value. The bell presents a further aid to the coach in supervising a number of machines.

The indicator of FIG. 1 is located in a position where it is visible by a charging trainee having his head held properly, but the trainee can still lower his head to an improper position and see the scale by moving his eye. In the indicator of FIGS. 10 to 12 the scale is visible only through the aperture 55a, which is relatively narrow. Hence, the trainee can see through that aperture only by having his head in the proper position. The apparatus therefore provides an incentive for the trainee to charge with his head held properly, so that he can see the amount of deflection he produces on the scale 53.

While I have shown and described a preferred embodiment of my invention, other modifications thereof will readily occur to those skilled in the art and I therefore intend my invention to be limited only by the appended claims.

I claim:

1. Athletic training apparatus, comprising:
   (a) a base;
   (b) a resilient hoop tangent to the base and extending upwardly therefrom;
   (c) means attaching the hoop to the base at the point of tangency, with an outer portion of the hoop extending upwardly from the attaching means and projecting laterally beyond the periphery of the base, and with an inner portion of the hoop extending upwardly from the attaching means and above the base;
   (d) a rigid brace extending between the base and the inner portion of the hoop; and
   (e) impact receiving means supported by the outer portion of the hoop and adapted to be charged by a trainee.

2. Athletic training apparatus as defined in claim 1, in which said base has a circular periphery, a convex under surface, and a concave upper surface.

3. Athletic training apparatus as defined in claim 2, in which said base has an outwardly convex flange extending for a substantial distance at least along that portion of its periphery farthest from said outer portion of the hoop.

4. Athletic training apparatus as defined in claim 2, including a removable covering for the lower side of said base, said covering having a substantial coefficient of friction to provide substantial friction between the base and an underlying smooth surface.

5. Athletic training apparatus as defined in claim 1, including:
   (a) removable means connecting the brace to the base and to the hoop;
   (b) said hoop attaching means being removable;
   (c) said removable connecting means and attaching means cooperating to permit convenient separation of the parts for storage or shipment.

6. Athletic training apparatus as defined in claim 1, in which said impact receiving means comprises:
   (a) a vertically elongated relatively stiff member of sheet material including a central portion presenting a concave surface to a charging trainee;
   (b) a vertically elongated pad mounted on the face of the relatively stiff member which is charged by the trainee, said pad being substantially wider than the relatively stiff member and being attached to the relatively stiff member with its center line out of alignment with the center line of the relatively stiff member so as to provide a substantial overlap along one side of the relatively stiff member; and
   (c) said pad having a transverse notch in said overlap just above the central portion of the relatively stiff member to permit passage of the trainee's head when his shoulder is engaging said central portion.

7. Athletic training apparatus as defined in claim 1, comprising:
   (a) a second resilient hoop tangent to the base at a locality spaced from the first hoop and extending upwardly therefrom;
   (b) means attaching the second hoop to the base at the point of tangency thereof, with an outer portion of the second hoop extending upwardly from the attaching means and projecting laterally beyond the periphery of the base, with an inner portion of the second hoop extending upwardly from the attaching means and above the base;
   (c) common rigid brace means including said first-mentioned rigid brace and extending between the base and the inner portions of both hoops; and
   (d) a second impact receiving means, supported by the outer portion of the second hoop and adapted to be charged by a trainee.

8. Athletic training apparatus, comprising:
   (a) shoulder impact receiving means adapted to be charged by a trainee moving in a predetermined direction and to receive the impact of the shoulder of the charging trainee;
   (b) forearm engaging means located laterally adjacent said shoulder impact receiving means with respect to the direction of charging movement of the trainee, said forearm engaging means being rigidly attached to said shoulder impact receiving means and adapted to receive the impact of the forearm of the charging trainee substantially concurrently with the impact of the trainee's shoulder against the shoulder impact receiving means; and
   (c) a common resilient support for both said shoulder impact receiving means and said forearm engaging means.

9. Athletic training apparatus as defined in claim 8, in which:
   (a) said shoulder impact receiving means comprises a vertically elongated member including a central portion presenting to a charging trainee a surface having a vertically extending concave profile;
   (b) said forearm engaging means comprises an impact receiving member located laterally adjacent said central portion and a single extension projecting upwardly from said impact receiving member.

10. Athletic training apparatus as defined in claim 8, in which said forearm engaging means comprises a U-shaped frame with the legs of the U extending transversely of the impact receiving means and attached thereto, a plate supported by the U-shaped frame, and a forearm engaging pad mounted on said plate.

11. Athletic training apparatus as defined in claim 8, in which said shoulder impact receiving means comprises:
   (a) a vertically elongated relatively stiff member of sheet material including a central portion presenting a concave surface to a charging trainee;
   (b) a vertically elongated pad mounted on the face of the relatively stiff member which is charged by the trainee, said pad being substantially wider than the relatively stiff member and being attached to the relatively stiff member with its center line out of alignment with the center line of the relatively stiff member so as to provide a substantial overlap along one side of the relatively stiff member; and
   (c) said pad having a notch above the central portion of the relatively stiff member to permit passage of the trainee's head when his shoulder is engaging said central portion, said notch being located laterally opposite to said forearm engaging means.

12. Athletic training apparatus comprising:
   (a) shoulder impact receiving means adapted to receive the impact of the shoulder of a charging trainee;
   (b) resilient support means for said impact receiving means, comprising:
      (1) a hoop;
      (2) a rigid brace connected to said hoop at a portion thereof remote from the impact receiving means;
   (c) means for measuring the deflection of the resilient support means by the trainee;
   (d) an indicator operated by said measuring means; and
   (e) means supporting said indicator in a location observable by the charging trainee when his shoulder is against the impact receiving means and his head is in the proper position for charging;

(f) said indicator means being attached to the connection of the brace and the hoop; and (g) extensible means attached to the indicator and to another portion of the hoop spaced from said connection for operating said indicator when said other portion of the hoop is deflected from its normal position with respect to said connection.

13. Athletic training apparatus as defined in claim 12, including:

(a) an arbor fixed on said rigid brace;
(b) a pulley rotatable on said arbor;
(c) said extensible means comprises:
 (1) a cable extending around said pulley and having one end connected to said other portion of the hoop;
 (2) a spring connected between the other end of the cable and said brace adjacent the end thereof adjacent said hoop;
(d) an indicator drum rotatable on said arbor;
(e) slip friction means between the drum and the arbor effective to retain the drum in any position to which it is rotated;
(f) a one-way driving connection between the pulley and the drum;
(g) a housing for the drum fixed on the arbor and having an aperture therein for viewing the drum, said aperture being located so that the drum is observable through the aperture by the trainee only when his shoulder is against the impact receiving means and his head is raised in the proper position; and
(h) an indicator reset rod projecting from the drum through an aperture in the housing to permit resetting of the drum to its zero position.

14. Athletic training apparatus as defined in claim 13, including:

(a) a striker arm fixed on the pulley for rotation therewith; and
(b) a ball housing rotatable on the arbor;
(c) a striker plate fixed on the ball housing for cooperation with the striker arm; and
(d) a slip friction connection between the ball housing and the arbor to allow angular adjustment of the striker plate position.

15. Athletic training apparatus comprising:

(a) shoulder impact receiving means adapted to receive the impact of the shoulder of a charging trainee, said impact receiving means including:
 (1) a vertically elongated relatively stiff member of sheet metal including a central portion presenting a concave surface to a charging trainee;
 (2) a vertically elongated pad mounted on the face of the relatively stiff member which is chargerd by the trainee, said paid being substantially wider than the relatively stiff member and being attached to the relatively stiff member with its center line out of alignment with the center line of the relatively stiff member so as to provide a substantial overlap along one side of the relatively stiff member;
 (3) said pad having a substantial notch above the central portion of the relatively stiff member to permit passage of the trainee's head when his shoulder is engaging said central portion; and
 (4) said indicator being aligned with and spaced from said notch and on the opposite side of the shoulder impact receiving means from the surface charged by the trainee;
(b) resilient support means for said impact receiving means;
(c) means for measuring the deflection of the resilient support means by the trainee;
(d) an indicator operated by said measuring means;
(e) means supporting said indicator in a location observable by the charging trainee when his shoulder is against the impact receiving means and his head is in the proper position for charging.

References Cited

UNITED STATES PATENTS

| | | |
|---|---|---|
| 1,250,197 | 12/1917 | Louppe. |
| 1,916,385 | 7/1933 | Oakes _____ 273—55 |
| 2,653,816 | 9/1953 | Young et al. _____ 273—55 |
| 2,820,365 | 1/1958 | Detzel _____ 273—55 |
| 2,929,629 | 3/1960 | Feula _____ 273—55 |
| 3,326,553 | 6/1967 | Forrest _____ 273—55 |
| 3,336,805 | 8/1967 | Austin _____ 273—55 |

FOREIGN PATENTS 1,216,099   4/1960   France.

RICHARD C. PINKHAM, Primary Examiner

THOMAS ZACK, Assistant Examiner

U.S. Cl. X.R.

273—55